United States Patent
Kim et al.

(10) Patent No.: US 11,828,873 B2
(45) Date of Patent: Nov. 28, 2023

(54) METHOD AND APPARATUS FOR DETECTING OBJECT BASED ON TRANSFORMING VOXEL TO PIXEL IMAGES USING RADAR SIGNAL

(71) Applicant: Samsung Electronics Co., Ltd., Suwon-si (KR)

(72) Inventors: Woosuk Kim, Hwaseong-si (KR); Seongwook Lee, Seoul (KR); Hyunwoong Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 314 days.

(21) Appl. No.: 17/126,485

(22) Filed: Dec. 18, 2020

(65) Prior Publication Data

US 2021/0302538 A1    Sep. 30, 2021

Related U.S. Application Data

(60) Provisional application No. 62/978,870, filed on Feb. 20, 2020.

(30) Foreign Application Priority Data

May 19, 2020   (KR) ........................ 10-2020-0059828

(51) Int. Cl.
   *G01S 7/41*       (2006.01)
   *G01S 13/931*     (2020.01)
   *G06N 3/08*      (2023.01)

(52) U.S. Cl.
   CPC .............. *G01S 7/417* (2013.01); *G01S 7/411* (2013.01); *G01S 7/415* (2013.01); *G01S 13/931* (2013.01); *G06N 3/08* (2013.01)

(58) Field of Classification Search
CPC .......... G01S 7/417; G01S 7/411; G01S 7/415; G01S 13/931; G01S 13/89; G06N 3/08
See application file for complete search history.

(56) References Cited

U.S. PATENT DOCUMENTS

| | | | | |
|---|---|---|---|---|
| 3,617,997 A | * | 11/1971 | Maass | ..................... G01S 13/52 367/113 |
| 4,594,593 A | * | 6/1986 | Nohmi | ..................... G09B 9/54 342/25 D |
| 6,686,868 B2 | | 2/2004 | Tokutsu et al. | |
| 10,067,227 B2 | | 9/2018 | Kamo et al. | |
| 10,482,331 B2 | | 11/2019 | Zeng | |
| 2010/0225764 A1 | * | 9/2010 | Nizko | ..................... G01S 13/04 348/152 |
| 2015/0301167 A1 | * | 10/2015 | Sentelle | .................. H01Q 9/27 342/22 |
| 2017/0147888 A1 | | 5/2017 | Zeng | |

(Continued)

FOREIGN PATENT DOCUMENTS

JP         5163088 B2     3/2013

*Primary Examiner* — Donald H B Braswell
(74) *Attorney, Agent, or Firm* — NSIP Law

(57) ABSTRACT

An object detection method and apparatus are provided, the object detection method includes receiving a radar reception signal reflected by an object using a radar apparatus, generating a data set for one or more reflection points of the object by processing the radar reception signal, and detecting the object corresponding to the reflection points based on the data set using a neural network-based object detection model.

17 Claims, 12 Drawing Sheets

(56) References Cited

U.S. PATENT DOCUMENTS

| | | |
|---|---|---|
| 2017/0206434 A1 | 7/2017 | Nariyambut Murali et al. |
| 2018/0067194 A1 | 3/2018 | Wodrich et al. |
| 2018/0348343 A1* | 12/2018 | Achour .................. H01Q 1/364 |
| 2019/0204834 A1 | 7/2019 | Harrison |
| 2019/0325241 A1 | 10/2019 | Nunn et al. |
| 2019/0336004 A1* | 11/2019 | Mihailescu .......... A61B 8/5261 |
| 2019/0353753 A1 | 11/2019 | Gebhardt |
| 2021/0286923 A1* | 9/2021 | Kristensen .............. G01S 7/412 |

* cited by examiner

METHOD AND APPARATUS FOR DETECTING OBJECT BASED ON TRANSFORMING VOXEL TO PIXEL IMAGES USING RADAR SIGNAL

CROSS-REFERENCE TO RELATED APPLICATIONS

This application claims the benefit under 35 USC 119(e) of U.S. Provisional Application No. 62/978,870 filed on Feb. 20, 2020, and the benefit under 35 USC 119(a) of Korean Patent Application No. 10-2020-0059828 filed on May 19, 2020, in the Korean Intellectual Property Office, the entire disclosures of which are incorporated herein by reference for all purposes.

BACKGROUND

Field

The following description relates to technology for detecting an object in the vicinity of a radar based on a radar signal reflected by the object.

Description of Related Art

Advanced driver-assistance systems (ADAS) are assistance systems that support driving to improve driver's safety and convenience and to avoid dangerous situations by using sensors mounted inside or outside vehicles. With the strengthening of driving regulations and preparation for commercialization of autonomous vehicles, the importance of this technology is increasing.

The sensors used in ADAS may include a camera, an infrared sensor, an ultrasonic sensor, a LiDAR, and a radar. Among those sensors, the radar has an advantage of being able to stably measure objects in the vicinity of a vehicle without being affected by the surrounding environment, such as weather, when compared to optical-based sensors. Accordingly, radars are important to build ADAS.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an object detection method performed by an electronic device, the object detection method including receiving a radar reception signal reflected by an object using a radar apparatus, generating a data set for one or more reflection points of the object by processing the radar reception signal, and detecting the object corresponding to the reflection points based on the data set using a neural network-based object detection model.

The object detection may include transmitting a radar transmission signal through a transmission antenna of the radar apparatus, wherein the radar reception signal may include the radar transmission signal reflected by the object.

The object detection may include determining voxel coordinates for a target reflection point in the data set, wherein the data set may include a velocity axis, a range axis, and an angle axis, and a voxel value of the voxel coordinates corresponds to a signal strength of the radar reception signal by the target reflection point.

The detecting may include transforming the data set according to a type of the object detection model, and detecting the object by inputting the transformed data set into the object detection model.

The detecting may include generating a target image by representing the reflection points on a two-dimensional (2D) plane based on the data set, and detecting the object based on the target image.

The voxel coordinates for a target reflection point may be determined in the data set, and a voxel value of the voxel coordinates may correspond to a signal strength of the radar reception signal by the target reflection point, and the generating of the target image may include determining pixel coordinates in the 2D plane based on the voxel coordinates, determining respective values of a number of channels based on the voxel value, and determining a pixel value of the pixel coordinates based on the respective values of the channels.

The determining of the pixel coordinates based on the voxel coordinates may include converting a velocity value of the voxel coordinates into a pre-calculated constant, and determining the pixel coordinates based on the converted voxel coordinates.

The data set may include a velocity axis, a range axis, and an angle axis, and the constant may be calculated by taking absolute values and a mean value of values on the velocity axis.

The number of channels may be red (R), green (G) and blue (B) channels.

The detecting of the object based on the target image may include setting an area of the object in the target image based on pixels of the target image corresponding to the reflection points, and detecting the object based on the area of the object.

The detecting of the object based on the target image may include determining a class of the object based on the pixels of the target image corresponding to the reflection points, and the detecting of the object based on the area of the object may include detecting the object based on the area of the object and the class of the object.

The object detection model may be set differently according to at least one of a configuration of antennas included in the radar apparatus and a form of a radar transmission signal.

The electronic device may be provided in an autonomous vehicle or a vehicle supporting advanced driver-assistance systems (ADAS).

The data set may correspond to a time interval, and the object detection method may include tracking the object based on a first object detected with respect to a first time interval and a second object corresponding to the first object detected with respect to a second time interval.

In another general aspect, there is provided an electronic device for detecting an object, the electronic device including a memory configured to store a program, and a processor configured to execute the program to receive a radar reception signal reflected by an object using a radar apparatus, generate a data set for one or more reflection points of the object by processing the radar reception signal, and detect the object corresponding to the reflection points based on the data set using a neural network-based object detection model.

The electronic device may be provided in an autonomous vehicle or a vehicle supporting advanced driver-assistance systems (ADAS).

In another general aspect, there is provided a method of updating an object detection model, performed by an electronic device, the method including generating a data set for one or more reflection points of an object by processing a radar reception signal reflected by the object and received through a radar apparatus, receiving object information indicated by each of the reflection points as a ground truth (GT), and updating the object detection model based on GT information.

The receiving of the object information indicated by each of the reflection points as the GT may include generating a target image by representing the one or more reflection points on a two-dimensional (2D) plane based on the data set, and receiving an area representing an object in the target image as the GT, wherein the updating of the object detection model based on the GT information comprises updating the object detection model based on the target image in which the area of the object is set.

The method may include determining an operation mode corresponding to any one or any combination of a configuration of antennas included in the radar apparatus and a form of a radar transmission signal, and changing the object detection model based on the operation mode.

Other features and aspects will be apparent from the following detailed description, the drawings, and the claims.

Figure 1:
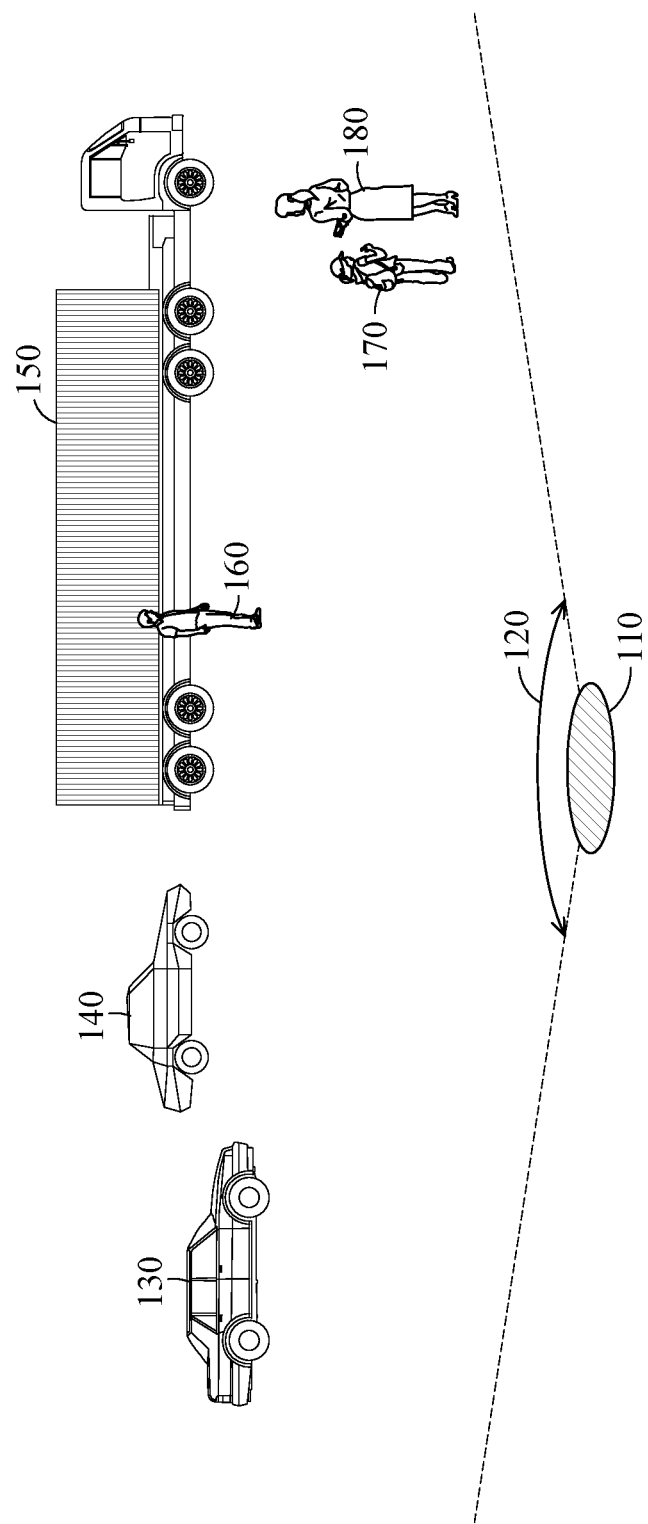
FIG. 1 illustrates an example of a scene captured by a radar apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

The same name may be used to describe an element included in the examples described above and an element having a common function. Unless otherwise mentioned, the descriptions on the examples may be applicable to the following examples and thus, duplicated descriptions will be omitted for conciseness.

FIG. 1 illustrates an example of a scene captured by a radar apparatus.

To detect an object in the vicinity of a radar apparatus 110, the radar apparatus 110 transmits a radar transmission signal through a transmission antenna and receives the radar transmission signal reflected by the object as a radar reception signal through a reception antenna. For example, the radar apparatus 110 may transmit and receive the radar signals through multiple-input and multiple-output (MIMO) antennas. A valid angle range 120 and a coverage of the radar apparatus 110 for detecting an object may vary according to a configuration of the antennas of the radar apparatus 110. The radar apparatus 110 transmits preset radar transmission signals to detect objects 130, 140, 150, 160, 170 and 180 in a scene shown at a time. The time may be a point in time at which the objects 130, 140, 150, 160, 170 and 180 are scanned through radar transmission signal.

The radar transmission signals may be reflected at many points of a single object according to the shape of the object, a difference in reflection coefficient, and settings of the radar apparatus 110. Due to the many reflection points by the radar transmission signals and a difference between radar cross-sections of the reflection points, many reflection points may be generated with respect to a single object. If reflection points are away from each other even on the same object, the reflection points may be detected as separate objects.

For example, the person 170 may be detected not as a single person, but as a plurality of objects due to high-reflection coefficient substances such as a watch and earrings that the person 170 is wearing. In another example, the vehicle 140 may be detected not as a single vehicle, but as a plurality of objects due to a physical structure of the vehicle 140, such as wheels or corners that are away from each other. The trailer 150 having front wheels and rear wheels that are away from each other may be recognized not as a single trailer, but as two separate vehicles.

By accurately determining an object indicated by reflection points detected by radar reception signals, it is possible to prevent a single object from being recognized or detected as two or more separate objects in practice. Hereinafter, a method of detecting an object will be described in detail with reference to FIGS. 2 through 15.

Figure 2:
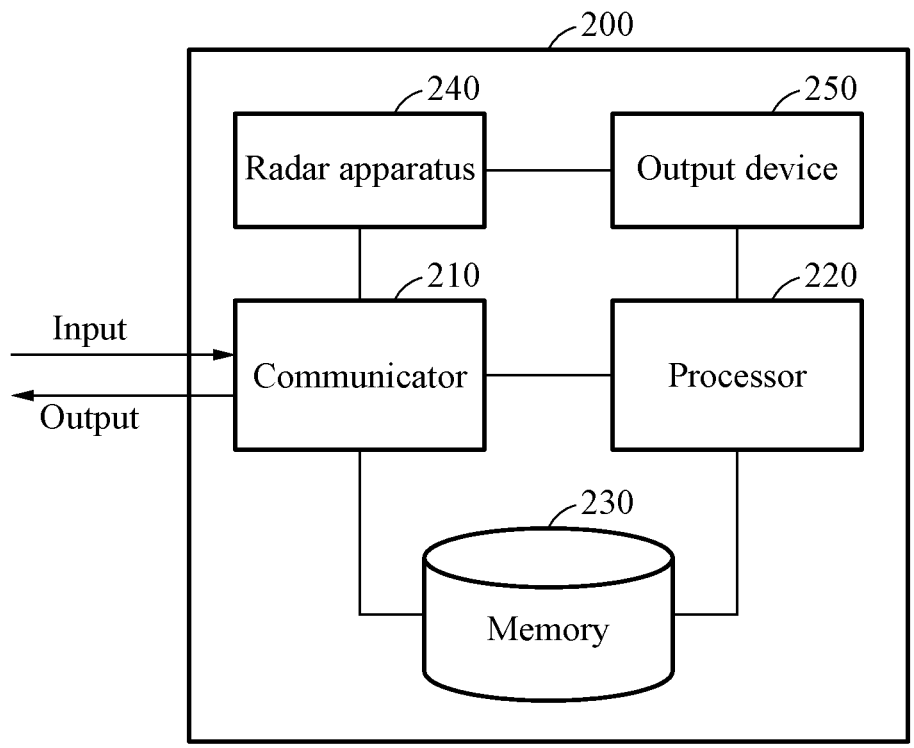
FIG. 2 illustrates an example of an electronic device for detecting an object.

FIG. 2 illustrates an example of an electronic device for detecting an object.

Referring to FIG. 2, an electronic device 200 for detecting an object includes a communicator 210, a processor 220, a memory 230, and an output device 250. The electronic device 200 may further include a radar apparatus 240 or may be connected to a radar apparatus 240 separated from the electronic device 200.

For example, the electronic device 200 may be a device mounted on a vehicle, but is not limited thereto. The vehicle may be an autonomous vehicle or a vehicle supporting advanced driver-assistance systems (ADAS).

The communicator 210 is connected to the processor 220, the memory 230, and the radar apparatus 240 to transmit and receive data to and from the processor 220, the memory 230, and the radar apparatus 240. The communicator 210 may be connected to another external device and transmit and receive data to and from the external device. Hereinafter, transmitting and receiving "A" may refer to transmitting and receiving "information or data indicating A".

The communicator 210 may be implemented as a circuitry in the electronic device 200. For example, the communicator 210 may include an internal bus and an external bus. In another example, the communicator 210 may be an element that connects the electronic device 200 to the external device. The communicator 210 may be an interface. The communicator 210 may receive data from the external device and transmit the data to the processor 220 and the memory 230.

The processor 220 processes the data received by the communicator 210 and data stored in the memory 230. The "processor" may be a data processing device implemented by hardware including a circuit having a physical structure to perform desired operations. For example, the desired operations may include instructions or codes included in a program. For example, the hardware-implemented data processing device may include a microprocessor, a central processing unit (CPU), a processor core, a multi-core processor, a multiprocessor, an application-specific integrated circuit (ASIC), and a field programmable gate array (FPGA). Further details regarding the processor 220 is provided below.

The processor 220 executes a computer-readable code (for example, software) stored in a memory (for example, the memory 230) and instructions triggered by the processor 220.

The memory 230 stores the data received by the communicator 210 and data processed by the processor 220. For example, the memory 230 may store the program (or an application, or software). The stored program may be a set of syntaxes that are coded and executable by the processor 420 to update an algorithm.

The memory 230 may include, for example, at least one volatile memory, nonvolatile memory, random-access memory (RAM), flash memory, a hard disk drive, and an optical disk drive. Further details regarding the memory 230 is provided below.

The memory 230 may store an instruction set (for example, software) for operating the electronic device 200. The instruction set for operating the electronic device 200 is executed by the processor 220.

The output device 250 may provide an output for the object detected by the electronic device 200 through a visual scheme, an auditory scheme, or a tactile scheme. The output device may include, for example, a display. In an example, the output device 250 is a physical structure that includes one or more hardware components that provide the ability to render a user interface, render a display, and/or receive user input. The output device 250 is not limited to the example described above, and any other displays, such as, for example, computer monitor, display of an advanced driver-assistance systems (ADAS), and eye glass display (EGD)

that are operatively connected to the electronic device 200 may be used without departing from the spirit and scope of the illustrative examples described. In an example, the output device 250 is a physical structure that includes one or more hardware components that provide the ability to render a user interface, render a display, output information, and/or receive user input. In an example, the output device 250 may receive a user input from a user. The output device 250 may detect an input from, for example, a keyboard, a mouse, a touch screen, a microphone, a motion detector, or a user, and may include any other device configured to transfer the detected input to the processor 220.

The communicator 210, the processor 220, the memory 230, and the radar apparatus 240 will be described in detail with reference to FIGS. 3 to 15 below.

Figure 3:
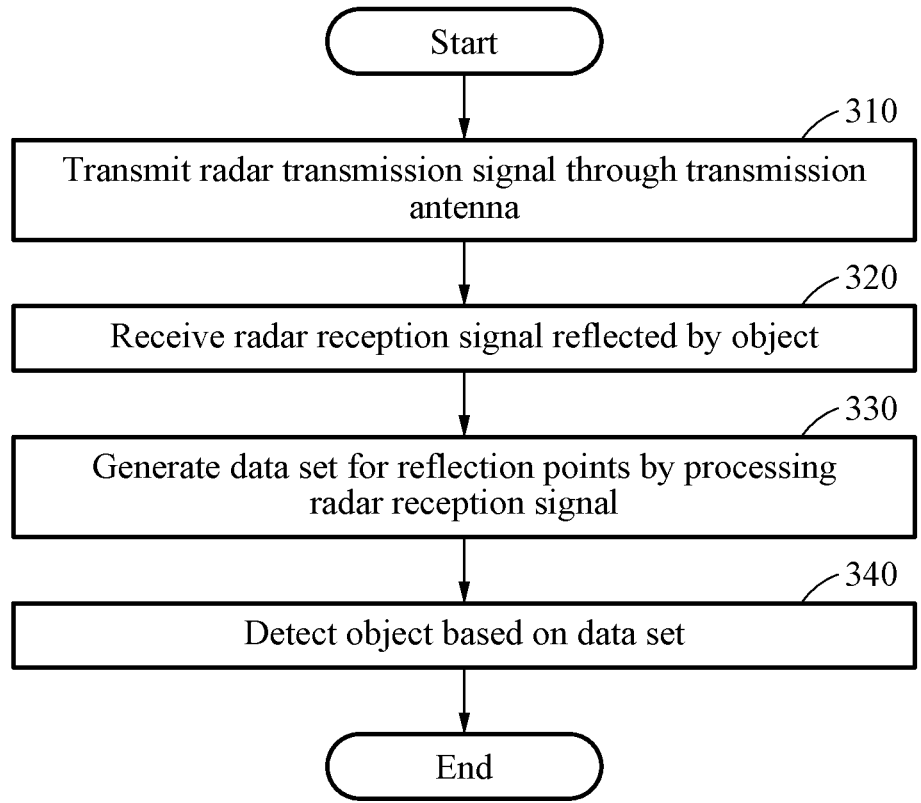
FIG. 3 illustrates an example of a method of detecting an object.

FIG. 3 illustrates an example of a method of detecting an object. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. In an example. operations 310 through 340, and combinations of the blocks, described below are performed by the electronic device 200 described above with reference to FIG. 2, or by special purpose hardware-based computer, such as a processor, that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

In operation 310, the electronic device 200 transmits a radar transmission signal through a transmission antenna of the radar apparatus 240. For example, the transmission antenna may include a plurality of antennas, and a time-division multiplexing frequency modulated continuous wave (TDM FMCW) may be transmitted through the plurality of antennas to the vicinity of the radar apparatus 240 as the radar transmission signal. The TDM FMCW may include a plurality of chirp signals transmitted by the plurality of antennas, respectively. The TDM FMCW will be described in detail below with reference to FIG. 4.

The radar transmission signal transmitted in a time interval may be for detecting objects in a scene of the time interval. For example, first radar transmission signals may be associated with objects in a scene of a first time detected based on the first radar transmission signals.

In operation 320, the electronic device 200 receives a radar reception signal through a reception antenna of the radar apparatus 240. The radar reception signal is the radar transmission signal reflected by at least one object in the vicinity of the radar apparatus 240. The reception antenna may include a plurality of antennas, and each of the plurality of antennas may receive a radar reception signal.

The reception antennas may receive different radar reception signals with respect to the same time due to the distance between the reception antennas. That is, times of flight (TOFs) of the radar reception signals differ according to the distance between the reception antennas, and thus the reception timings of the radar reception signals may vary. Further, as an object moves, the reception timings may vary even with respect to the same reception antenna. A range, a velocity, and an angle for a reflection point may be determined based on the difference between the reception timings of the plurality of reception antennas.

The radar reception signal will be described in detail below with reference to FIG. 4.

In operation 330, the electronic device 200 generates a data set for one or more reflection points by processing the radar reception signal reflected by the object. The data set may be object detection information. For example, the data set may include range, velocity, and angle information for each of the reflection points. That is, the data set may be a third-order tensor. The plurality of reflection points may be reflection points generated in one object or may be reflection points generated in a plurality of objects. A distance between the radar apparatus 240 and a reflection point, a velocity, and an angle may be determined by classifying the received radar reception signal according to a sampling cycle, a chirp signal order, transmission antennas, or a configuration of transmission and reception antennas and then, by applying a signal processing process such as fast Fourier transform (FFT) thereto. For example, a first data set is generated for the first radar transmission signals.

The data set for the reflection points may have a shape of a three-dimensional (3D) data cube. For example, the data set may be in the form of a matrix, table, or data structure having a shape of a 3D data cube, but is not limited thereto. When the data set is represented by a 3D data cube such as a matrix, a position of a reflection point in the 3D data cube corresponding to the range, velocity, and angle of the reflection point may be determined. The position of a target reflection point in the 3D data cube may be determined to be target voxel coordinates. For example, the voxel value of the target voxel coordinates may correspond to a signal strength of the radar reception signal from the target reflection point. The 3D data cube will be described in detail below with reference to FIG. 5.

In operation 340, the electronic device 200 detects an object in the vicinity of the radar apparatus 240 corresponding to the reflection points based on the data set. For example, at least one of the class, the size, the position, and the velocity of the object may be determined to be object information based on the one or more reflection points, and the object may be detected based on the object information. The detected object may be represented by the size and position of the object and classified by the class of the object.

The electronic device 200 detects the object through an object detection algorithm receiving the data set as an input. The object detection algorithm may be updated (or trained) in advance to detect the object based on the data set.

The object detection algorithm may be a neural network-based object detection model. For example, the object detection algorithm may be a deep neural network (DNN)-based algorithm. In another example, the object detection algorithm may be a convolutional neural network (CNN)-based algorithm. The CNN-based object detection algorithm may be an algorithm based on a region-based convolution neural network (R-CNN) that recognizes and distinguishes objects in a radar image. The R-CNN may be an algorithm based on a one-stage method that further considers a factor related to the velocity of an object. The object detection model may be generated in advance based on various neural networks, and is not limited to the examples described above.

The data set may be transformed or post-processed depending on the type of object detection algorithm. For example, if the data set is a 3D matrix, and the depth of the matrix is 4 or more, the data set may be transformed by adjusting the number of bins for FFT. In another example, if the depth of the matrix is 3, a radar image may be generated based on the data set. The electronic device 200 generates the radar image based on the data set, and detects the object through the object detection algorithm receiving the radar image as an input. If a radar image is used, the conventional CNN-based object detection model may be used for object detection. An example of detecting an object based on a radar image will be described in detail below with reference to FIGS. 7 to 14.

The object detection algorithm, which is used to detect an object, may be set differently according to at least one of the configuration of the antennas included in the radar apparatus 240 and the form of the radar transmission signal. For example, an operation mode of the algorithm corresponding to the configuration of the antennas and the form of the radar transmission signal may be set. An example of updating the algorithm will be described in detail below with reference to FIGS. 16 to 18.

The operation of an apparatus including the electronic device 200 may be determined based on the object detected in the vicinity of the radar apparatus 240. For example, if a vehicle includes the electronic device 200, a moving path of the vehicle may be determined based on the object.

Figure 4:
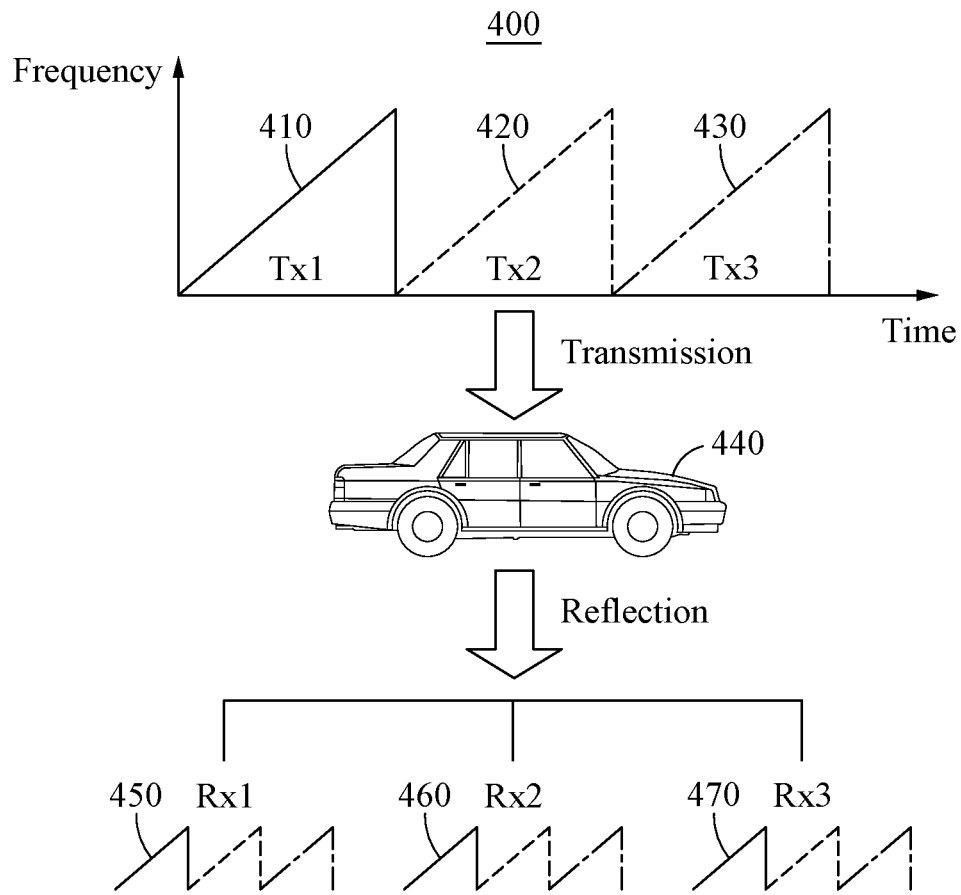
FIG. 4 illustrates an example of a radar transmission signal and a radar reception signal.

FIG. 4 illustrates an example of a radar transmission signal and a radar reception signal.

Referring to FIG. 4, a radar transmission signal 400 includes a first signal 410, a second signal 420, and a third signal 430. Each of the first signal 410, the second signal 420, and the third signal 430 may be a frequency modulated continuous wave (FMCW). The first signal 410 is transmitted by a first transmission antenna Tx1, the second signal 420 is transmitted by a second transmission antenna Tx2, and the third signal 430 is a third transmission antenna (Tx3). The first signal 410, the second signal 420, and the third signal 430 may be time-divided to be transmitted without overlap. That is, the radar transmission signal 400 may be a time division multiplexing frequency modulated continuous wave (TDM FMCW).

Although it is shown that the radar transmission signal 400 includes a single signal set including the first signal 410, the second signal 420, and the third signal 430, the radar transmission signal 400 may include other number of signal sets. The number of signal sets may vary depending on the performance of the electronic device 200 processing a radar reception signal. As the signal processing performance increases, the number of signal sets may increase.

The radar apparatus 240 transmits the radar transmission signal 400 through the plurality of transmission antennas. The radar transmission signal 400 is reflected by an object 440 at reflection points, and the radar apparatus 240 receives radar reception signals 450, 460, and 470 through a plurality of reception antennas. For example, a first reception antenna Rx1 may receive the radar reception signal 450, a second reception antenna Rx2 may receive the radar reception signal 460, and a third reception antenna Rx3 may receive the radar reception signal 470. The timings at which the reception antennas receive the radar reception signals vary according to the interval between the reception antennas. As the distances to the object 440 increases, the timings of receiving the radar reception signals are delayed. The ranges, velocities, and angles for the reflection points of the object 440 may be determined based on a difference between the timings of receiving the radar reception signals.

For example, if the first signal 410, the second signal 420, and the third signal 430 constitute a signal set, and a plurality of signal sets are transmitted, the ranges for the reflection points may be determined based on a sampling cycle with respect to the same chirp signals in the radar reception signals 450, 460, and 470 corresponding to the first signal 410.

For example, if the first signal 410, the second signal 420 and the third signal 430 constitute a signal set, a plurality of signal sets are transmitted, and the first transmission antenna Tx1 and the first reception antenna Rx1 are set as a pair, the velocities of the reflection points may be determined based on a result of sampling the same chirp signals in the radar reception signal 450 corresponding to the first signal 410.

For example, if the first transmission antenna Tx1 and the first reception antenna Rx1 are set as a first pair, the first transmission antenna Tx1 and the second reception antenna Rx2 are set as a second pair, and the third transmission antenna Tx3 and the third reception antenna Rx3 are set as a third pair, the angles at which the reflection points are located may be determined based on a result of processing the radar reception signals 450, 460, and 470 using the first to third pairs.

Figure 5:
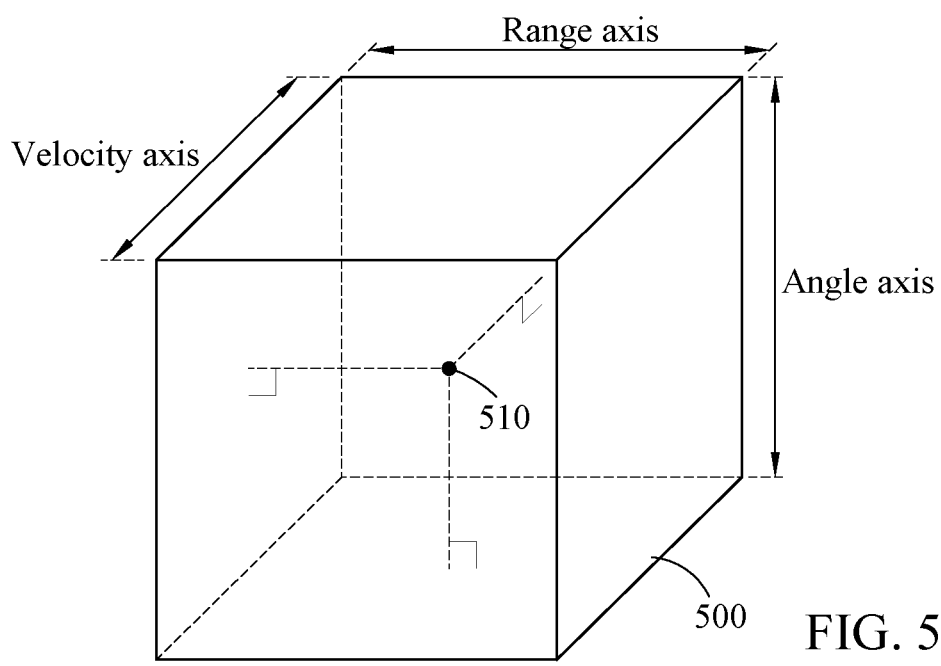
FIG. 5 illustrates an example of a three-dimensional (3D) data cube representing a data set generated with respect to reflection points of an object.

FIG. 5 illustrates an example of a three-dimensional (3D) data cube representing a data set generated with respect to reflection points of an object.

The data set for the reflection points described above with reference to FIG. 3 may include fields respectively for velocity information, range information, and angle information of the reflection points. In the case of visually representing the respective fields, the reflection points may be represented in a 3D space having the fields as axes (velocity axis, range axis, and angular axis). A portion of the 3D space in which the reflection points are located may be referred to as a data cube 500. For example, the overall size of the data cube 500 may be determined according to a set configuration of radar antennas and characteristics of a radar transmission signal. The maximum range, maximum velocity, and maximum angle of the reflection points may be determined according to the configuration of the radar antennas and the characteristics of the radar transmission signal, and the size of the data cube 500 may be determined in advance based on the determined maximum range, maximum velocity, and maximum angle.

If the data cube 500 is generated, coordinates of a voxel 510 for a reflection point of the object 440 in the data cube 500 may be determined. The voxel value of the voxel coordinates corresponds to a signal strength of a radar reception signal from the reflection point. Voxel values of voxel coordinates may be determined based on the velocities, ranges, and angles of the reflection points.

Figure 6:
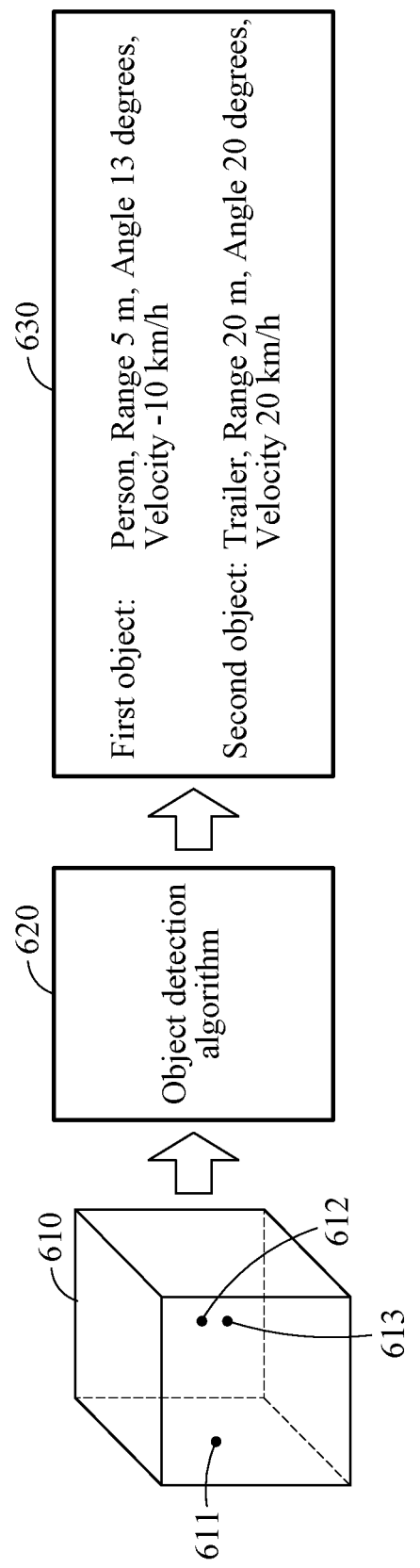
FIG. 6 illustrates an example of detecting objects based on a data set.

FIG. 6 illustrates an example of detecting objects based on a data set.

For example, voxels 611, 612, and 613 corresponding to a plurality of reflection points may be located in a data cube 610. The voxel coordinates of each of the voxels 611, 612, and 613 may indicate a range, a velocity, and an angle of a reflection point corresponding to each voxel. The voxel value of each of the voxels 611, 612, and 613 may indicate a signal strength of a radar reception signal from each reflection point.

Based on voxel coordinates and voxel values of the voxels 611, 612, and 613 being input, an object detection algorithm 620 may detect one or more objects as an output 630. For example, a first object may be detected as a person having a reflection point corresponding to the voxel 611, and a second object may be detected as a trailer having reflection points corresponding to the voxels 612 and 613. The object detection algorithm 620 may determine the separated voxels 612 and 613 to be reflection points generated by a single trailer.

An example of updating the object detection algorithm 620 will be described in detail below with reference to FIGS. 16 to 18.

Figure 7:
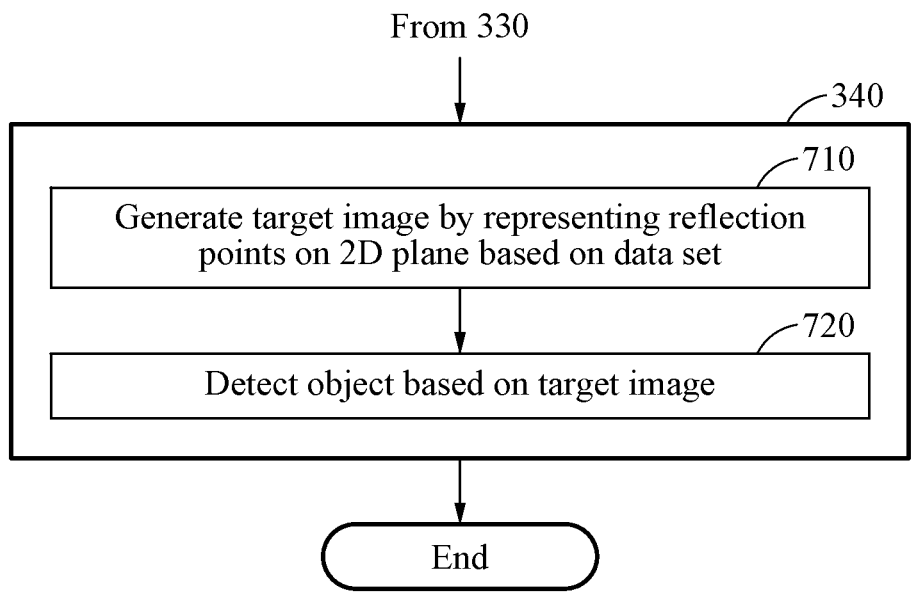
FIG. 7 illustrates an example of detecting an object based on a target image representing reflection points.

FIG. 7 illustrates an example of detecting an object based on a target image representing reflection points. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer, such as a processor, that perform the specified functions, or combinations of special purpose hardware and computer instructions. In addition to the description of FIG. 7 below, the descriptions of FIGS. 1-6 are also applicable to FIG. 7, and are incorporated herein by reference. Thus, the above description may not be repeated here.

A data set to be input into an object detection algorithm may be adaptively deformed according to the type of the object detection algorithm. For example, if the object detection algorithm is an image processing algorithm, a radar image representing the position of a reflection point and the intensity of a reflection signal may be generated as an input for the algorithm based on the data set. Since the image is two-dimensional (2D) data, a 3D data set may need to be transformed into a 2D form. If the object detection algorithm is an image processing algorithm, operation 340 described above with reference to FIG. 3 may include operations 710 and 720 described below.

In operation 710, the electronic device 200 generates a target image, which is a radar image, by representing reflection points on a preset 2D plane based on the data set. That is, the target image is an input for the algorithm generated by transforming the data set according to the type of the algorithm. The 2D plane may be a plane of a bird's eye view based on the radar apparatus 240. The 2D plane will be described in detail below with reference to FIG. 10.

A reflection point may correspond to the coordinates of a pixel of the target image, and the signal strength for the reflection point may correspond to a pixel value. That is, the target image may be an image representing the positions of the reflection points and the signal strengths. An example of determining pixel coordinates and pixel values of reflection points will be described in detail below with reference to FIGS. 8 and 9.

In operation 720, the electronic device 200 detects an object through an object detection algorithm receiving the target image as an input. The object detection algorithm may be updated (or trained) in advance to detect the object based on the radar image. The object detection algorithm may be set differently according to the configuration of antennas included in the radar apparatus 240. For example, an operation mode of the algorithm corresponding to the configuration of the antennas and the form of the radar transmission signal may be set. An example of updating an object detection algorithm based on a radar image will be described in detail below with reference to FIGS. 16 to 18.

An area of the object may be set in the target image to include at least one reflection point corresponding to a result of object detection. Reflection points generated by the same object may be included in the same area. An example of detecting an object by setting an area of an object in a target image will be described in detail below with reference to FIG. 12.

The class of the object may be determined based on pixels of the target image corresponding to the reflection points. An example of determining a class of an object based on pixels of a target image will be described in detail below with reference to FIGS. 13 and 14.

Figure 8:
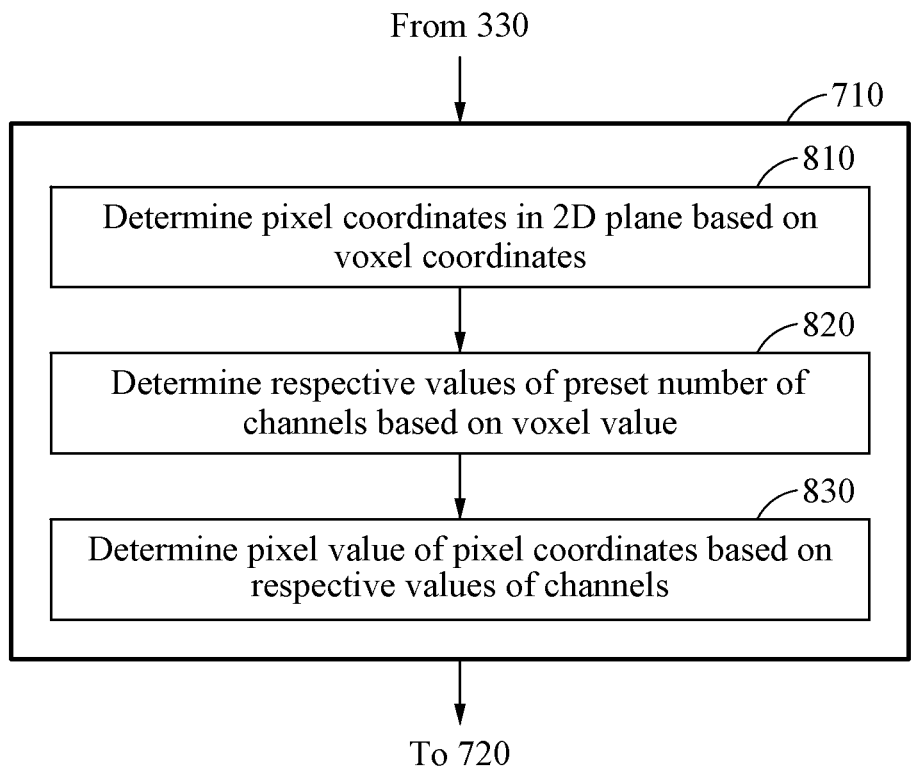
FIG. 8 illustrates an example of generating a target image based on a data set.

FIG. 8 illustrates an example of generating a target image based on a data set. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer, such as a processor, that perform the specified functions, or combinations of special purpose hardware and computer instructions. In addition to the description of FIG. 8 below, the descriptions of FIGS. 1-7 are also applicable to FIG. 8, and are incorporated herein by reference. Thus, the above description may not be repeated here.

Operation 710 described above with reference to FIG. 7 includes operations 810 to 830 described below.

In operation 810, the electronic device 200 determines target pixel coordinates in the 2D plane based on the target voxel coordinates in the data set (for example, 3D data cube) for the target reflection point. The 2D plane may show a bird's eye view based on the position of the radar apparatus 240. For example, the 2D plane may be set to show an area covered by the radar apparatus 240. An example of determining pixel coordinates will be described in detail below with reference to FIG. 9.

In operation 820, the electronic device 200 determines respective values of a preset number of channels based on the target voxel value of the target voxel. The number of channels may be determined in advance according to the form of data (for example, the depth of the data set) to be input into the object detection algorithm. For example, when the preset number of channels is "3", the 3 channels may be red (R), green (G), and blue (B) channels representing colors. R, G, and B values for a target voxel value may be respectively determined. The R, G, and B values may be determined such that the target voxel may be more clearly visually perceived by a person as the voxel value increases. The number of channels and the values indicated by the channels may vary according to examples, and are not limited to the examples described above.

In operation 830, the electronic device 200 determines a pixel value of the pixel coordinates based on the respective values of the channels. For example, the pixel value may be a color value.

In an example, the electronic device 200 may remove noise in the generated target image. For example, the noise in the target image may be removed by adjusting a pixel value less than a preset intensity to a preset pixel value.

Figure 9:
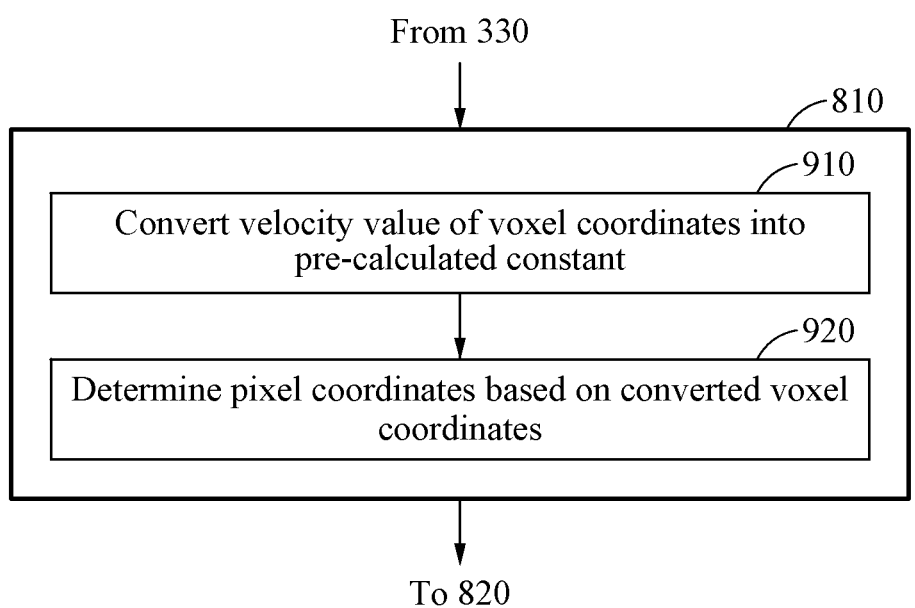
FIG. 9 illustrates an example of determining pixel coordinates in a two-dimensional (2D) plane based on voxel coordinates.

FIG. 9 illustrates an example of determining pixel coordinates in a two-dimensional (2D) plane based on voxel coordinates. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. One or more blocks of FIG. 9, and combinations of the blocks, can be implemented by special purpose hardware-based computer, such as a processor, that perform the specified functions, or combinations of special purpose hardware and computer instructions. In addition to the description of FIG. 9 below, the descriptions of FIGS. 1-8 are also applicable to FIG. 9, and are incorporated herein by reference. Thus, the above description may not be repeated here.

Operation 810 described above with reference to FIG. 8 includes operations 910 and 920 described below.

In operation 910, the electronic device 200 converts a velocity value of the voxel coordinates of the target voxel into a pre-calculated constant. For example, the pre-calculated constant may be calculated by taking absolute values and a mean value of the values of a plurality of target voxels on the velocity axis. By converting the velocity value of the voxel coordinates of the target voxel into the pre-calculated constant, the 3D data set may be transformed into a 2D data set representing only the ranges and angles of the reflection points.

In operation 920, the electronic device 200 determines the pixel coordinates and pixel values in the target image representing the 2D plane based on the converted voxel coordinates and voxel value of the target voxel. The pixel coordinates may indicate the positions of the reflection points.

Figure 10:
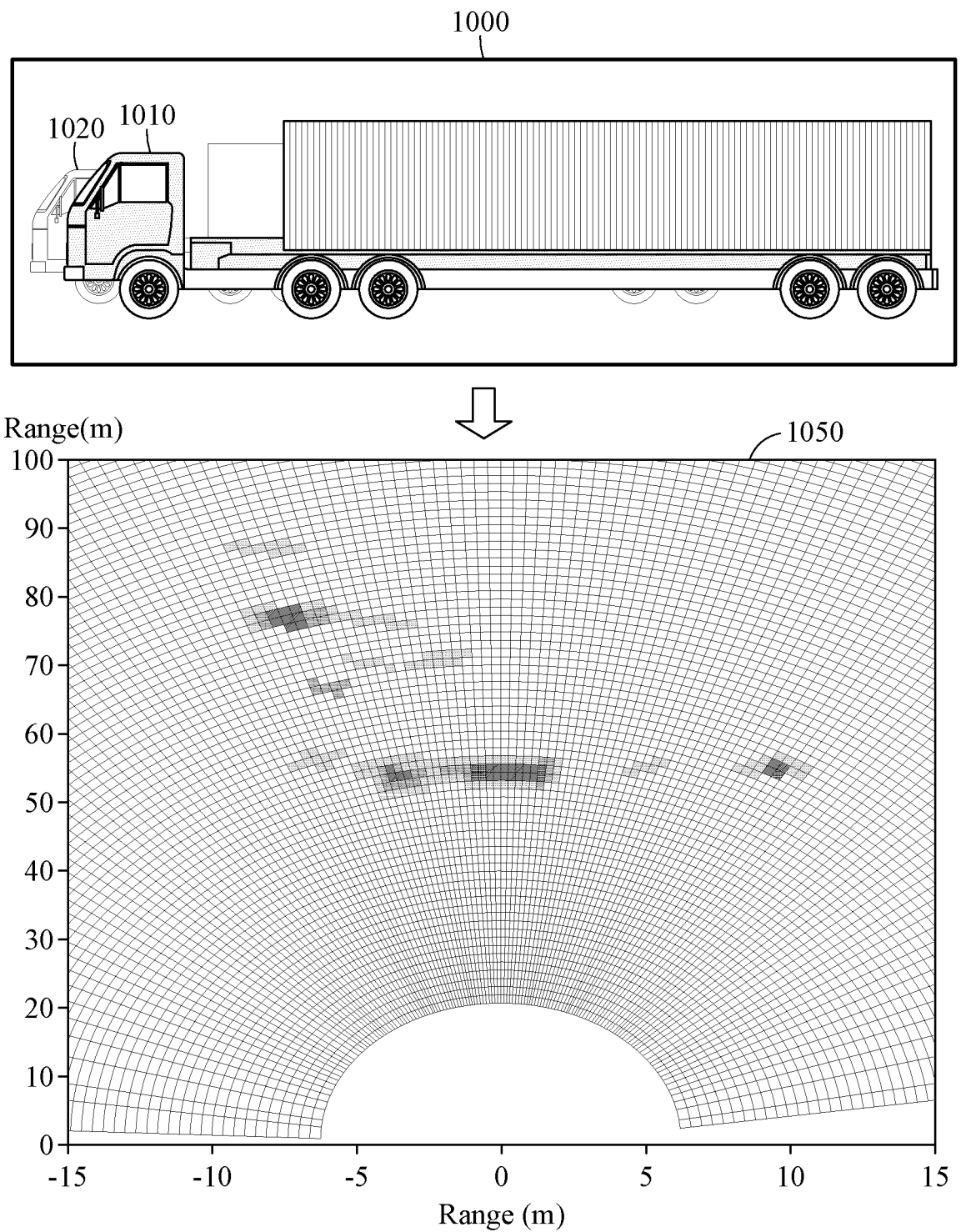
FIG. 10 illustrates an example of a scene in which an object is located, and a target image generated with respect to the scene.

FIG. 10 illustrates an example of a scene in which an object is located and a target image generated with respect to the scene.

In a scene 1000 scanned by the radar apparatus 240, there are a first trailer 1010 and a second trailer 1020 located behind the first trailer 1010. The second trailer 1020 may be partially hidden by the first trailer 1010. The radar apparatus 240 detects reflection points of the trailers 1010 and 1020 and represents the detected reflection points on a target image 1050. The target image 1050 may be an image regarding the position of the scene 1000 relative to the position of the radar apparatus 240. For example, the x-axis of the target image 1050 may indicate the range for the left and right directions from the radar apparatus 240, and the y-axis may indicate the range for the front direction from the radar apparatus 240.

The position of the reflection point may correspond to the pixel coordinates of the target pixel in the target image 1050, and the signal strength for the reflection point may correspond to the pixel value of the target pixel. For example, as the signal strength increases, the pixel value may increase (for example, becoming more visually intense).

Figure 11:
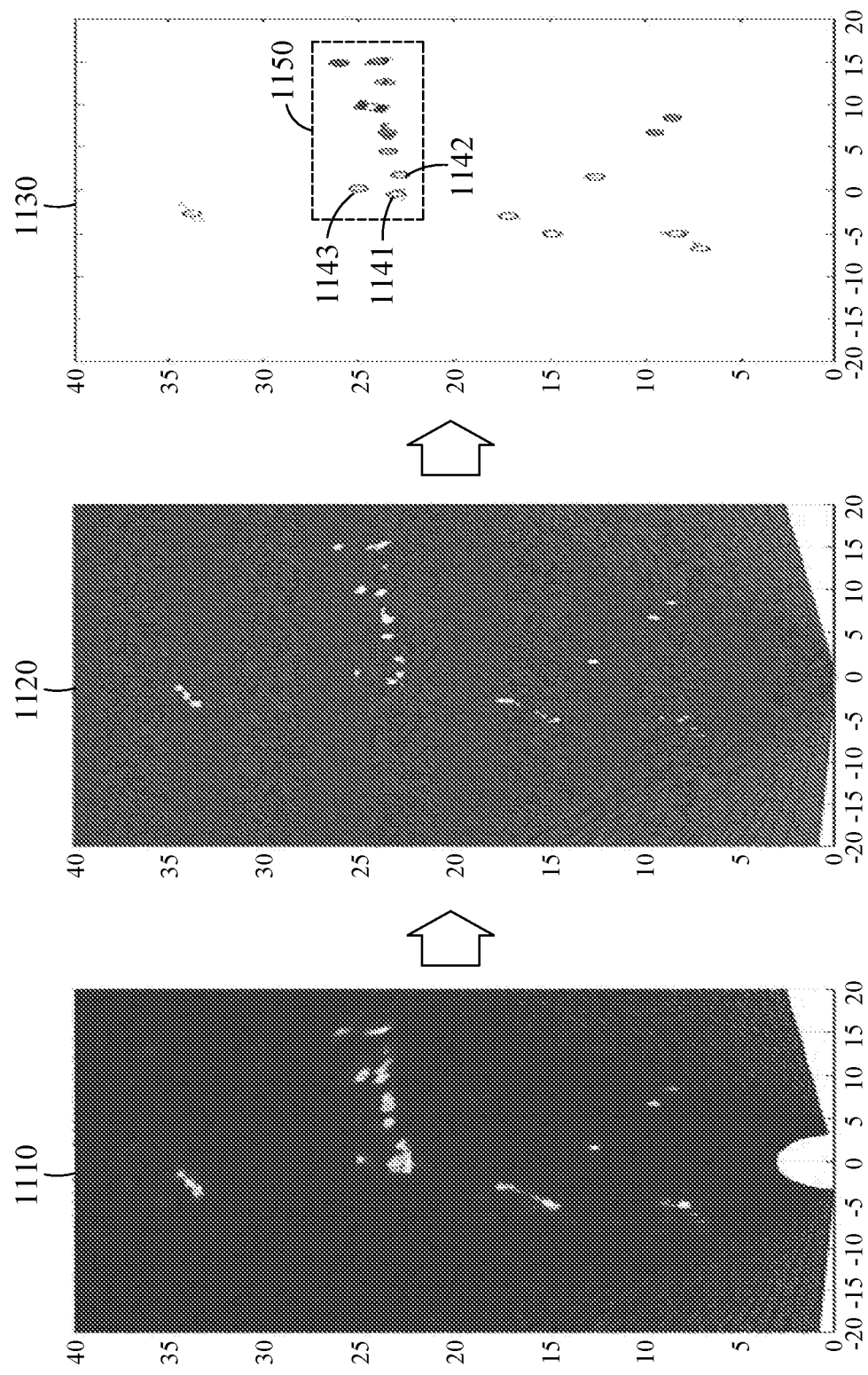
FIG. 11 illustrates an example of detecting an object based on clustered reflection points in a target image.

FIG. 11 illustrates an example of detecting an object based on clustered reflection points in a target image.

Reflection points on the target image 1050 described above with reference to FIG. 10 may be determined or detected based on the target image 1050, and at least one object may be detected based on the reflection points. For example, operation 330 described above with reference to FIG. 3 or operation 720 of FIG. 7 may include operations 1110 to 1130 described below.

In operation 1110, the electronic device 200 generates range-angle (RA) domain information as the target image by pre-processing the received radar reception signal. For example, the generated target image may be the target image 1050 described above with reference to FIG. 10.

In operation 1120, the electronic device 200 detects the reflection points by applying, to the target image, a constant false alarm rate (CFAR) of which a threshold is determined according to surrounding signal strength. For example, the CFAR may be an ordered statistic constant false alarm rate (OS-CFAR).

In operation 1130, the electronic device 200 groups the detected reflection points with adjacent reflection points through clustering technology. For example, the clustering technique used may be density-based spatial clustering of applications with noise (DBSCAN). The grouped reflection points 1141, 1142, and 1143 may be regarded as separate reflection points.

The electronic device 200 may detect at least one object based on each of the grouped reflection points 1141, 1142, and 1143. For example, a plurality of objects respectively corresponding to the reflection points 1141, 1142, and 1143 may be determined.

As the resolution of the antenna apparatus 240 increases, the performance of classifying a plurality of reflection points generated by one object may increase. For example, in the case of an object having a long shape or a large size, such as a trailer, the antenna apparatus 240 having good resolution may detect a plurality of reflection points with respect to a single object. In detail, an area 1150 corresponds to the actual shape of the trailer, and a plurality of reflection points 1141, 1142, and 1143 may be detected for the trailer.

In practice, if a plurality of reflection points generated by a single object are determined to be generated by different objects, an object detection error may occur. For example, if the electronic device 200 is mounted on a vehicle, the object detection error may lead to a traffic accident, and thus accurate object detection is required. To reduce the object detection error occurring as the plurality of reflection points are detected for a single object, a neural network-based object detection model (or algorithm) that determines an object as an output with respect to an input of the target image may be used.

The neural network-based object detection model may be trained in advance based on various target images and ground truth (GT) information of the object for the target images. According to the well-trained neural network-based object detection model, the trailer corresponding to the plurality of reflection points 1141, 1142, and 1143 may be determined to be an object, and the position and size of the trailer may be represented.

Hereinafter, an example of detecting an object based on a neural network-based object detection model will be described in detail with reference to FIGS. 12 to 14.

Figure 12:
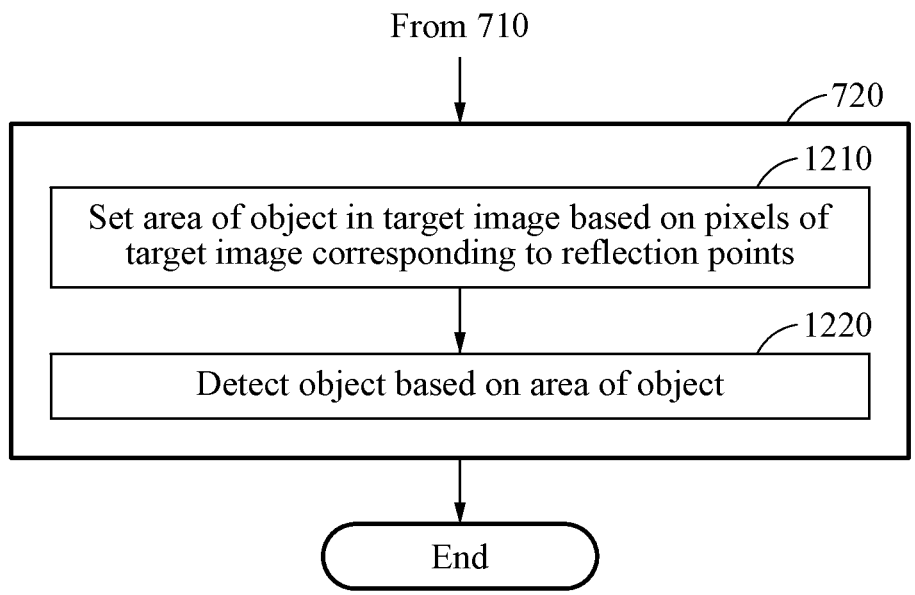
FIG. 12 illustrates an example of detecting an object based on an area of an object set in a target image.

FIG. 12 illustrates an example of detecting an object based on an area of an object set in a target image. The operations in FIG. 12 may be performed in the sequence and manner as shown, although the order of some operations may be changed or some of the operations omitted without departing from the spirit and scope of the illustrative examples described. Many of the operations shown in FIG. 12 may be performed in parallel or concurrently. One or more blocks of FIG. 12, and combinations of the blocks, can be implemented by special purpose hardware-based computer, such as a processor, that perform the specified functions, or combinations of special purpose hardware and computer instructions. In addition to the description of FIG. 12 below, the descriptions of FIGS. 1-11 are also applicable to FIG. 12, and are incorporated herein by reference. Thus, the above description may not be repeated here.

Operation 720 described above with reference to FIG. 7 includes operations 1210 and 1220 described below.

In operation 1210, the electronic device 200 sets an area of the object in the target image based on pixels of the target image corresponding to the reflection points. The object detection algorithm sets the area of the object to include a pixel of at least one reflection point based on features represented by the pixel values of the pixels of the target image. For example, the area of the object may be set to include a plurality of reflection points. By setting the area of the object, the object may be represented.

In operation 1220, the electronic device 200 detects the object based on the area of the object.

Although it is described that operations 1210 and 1220 are performed in time series, operations 1210 and 1220 may be performed simultaneously. For example, the algorithm may determine the area of the object together by detecting the object represented by the reflection points in the target image. In another example, the algorithm may detect the object by determining the area of the object represented by the reflection points in the target image.

Figure 13:
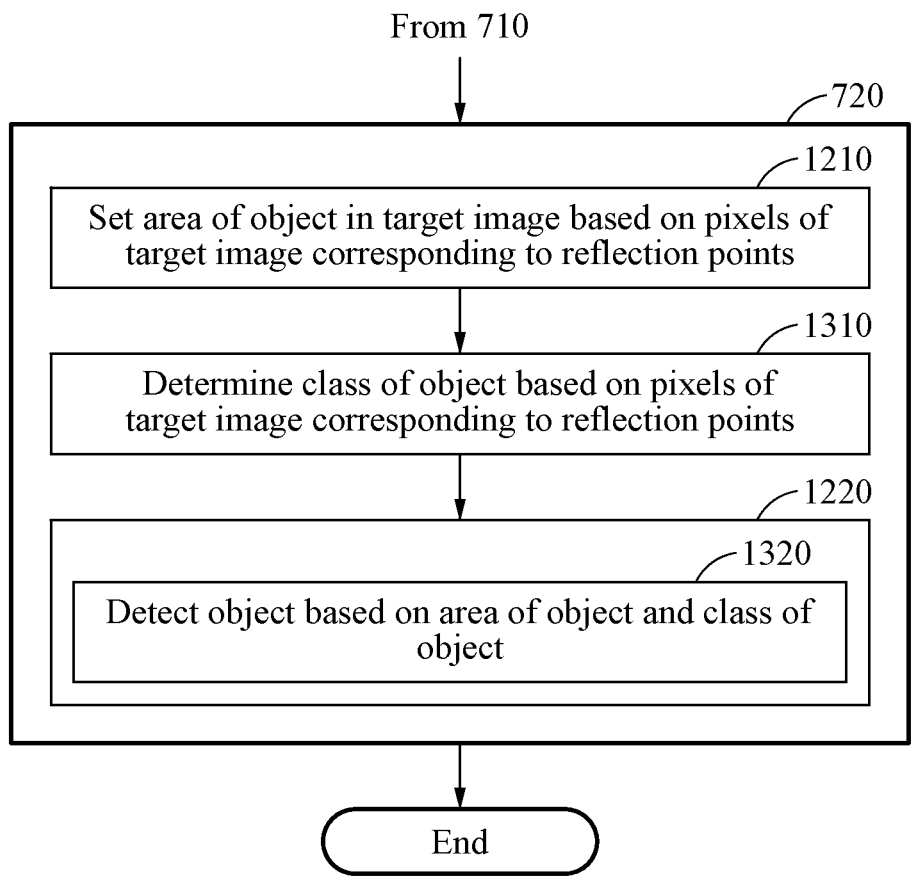
FIG. 13 illustrates an example of detecting an object based on a class of an object.

FIG. 13 illustrates an example of detecting an object based on a class of an object. The operations in FIG. 13 may be performed in the sequence and manner as shown, although the order of some operations may be changed or some of the operations omitted without departing from the spirit and scope of the illustrative examples described. Many of the operations shown in FIG. 13 may be performed in parallel or concurrently. One or more blocks of FIG. 13, and combinations of the blocks, can be implemented by special purpose hardware-based computer, such as a processor, that perform the specified functions, or combinations of special purpose hardware and computer instructions. In addition to the description of FIG. 13 below, the descriptions of FIGS. 1-12 are also applicable to FIG. 13, and are incorporated herein by reference. Thus, the above description may not be repeated here.

Operation 720 described above with reference to FIG. 12 may further include operation 1310, and operation 1220 of FIG. 12 may include operation 1320.

In operation 1310, the electronic device 200 determines a class of the object in the target image based on pixels of the target image corresponding to the reflection points. For example, the class of the object may include a pedestrian, a sedan, and a trailer, and is not limited to the examples described above. When the class of the object is determined, the object may be classified according to the type.

If operation 1310 is performed after operation 1210 is performed, the electronic device 200 may determine the class of the object further considering the size according to the area of the object.

In operation 1320, the electronic device 200 detects the object based on the area and the class of the object.

Although it is described that operations 1210, 1310, and 1320 are performed in time series, operations 1210, 1310, and 1320 may be performed simultaneously. For example, the algorithm may determine the area and the class of the object together by detecting the object represented by the reflection points in the target image. In another example, the algorithm may detect the object by determining the area and the class of the object represented by the reflection points in the target image.

Figure 14:
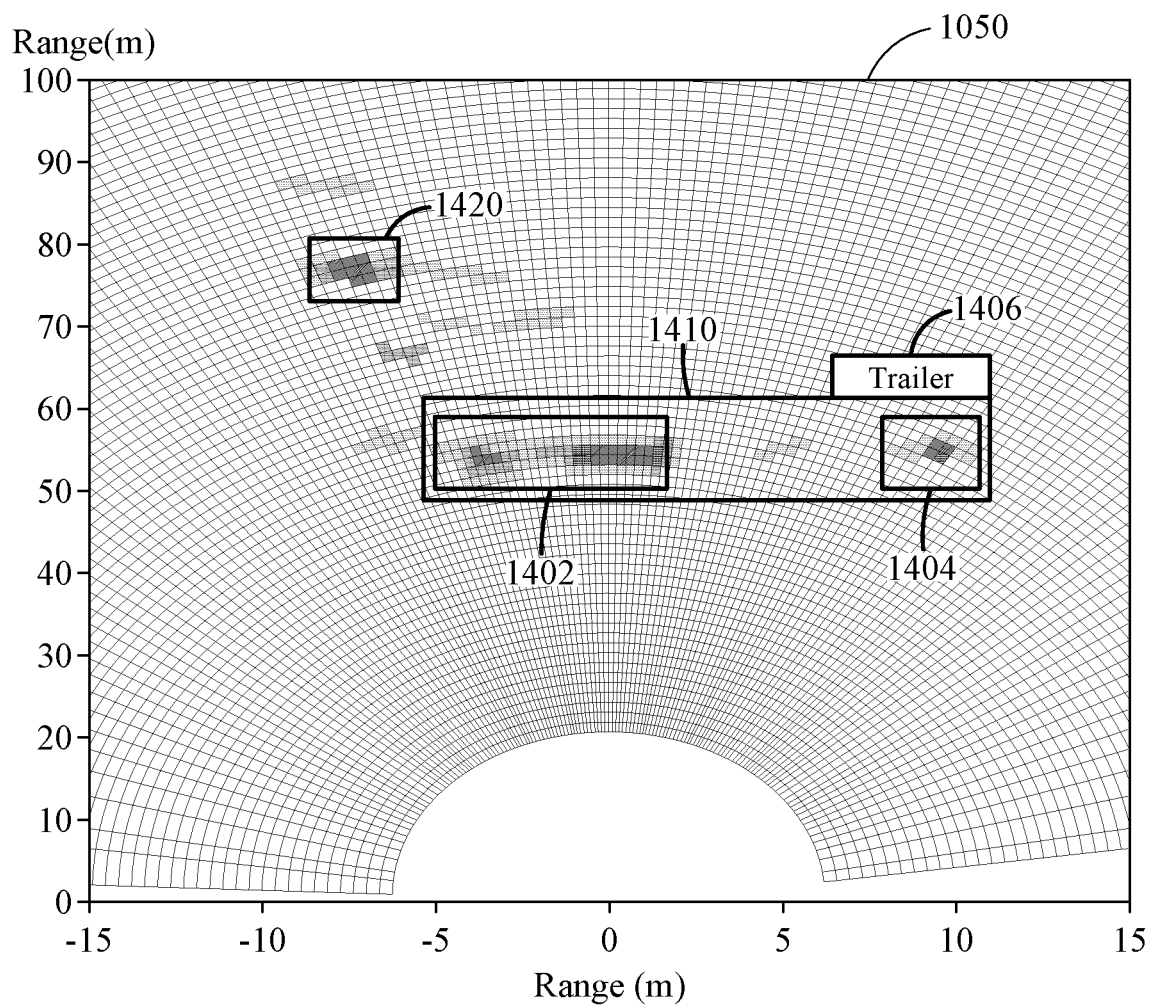
FIG. 14 illustrates an example of an area of an object set in a target image and a determined class of the object.

FIG. 14 illustrates an example of an area of an object set in a target image and a determined class of the object.

The object detection algorithm detects the object by determining the area and the class of the object in the target image 1050. For example, a trailer may be detected to be the object by determining an area 1410 and a class 1406 of the object. The object detection algorithm may determine that the reflection points 1402 and 1404 are generated by the same object, and set the area 1410 of the object to include the reflection points 1402 and 1404.

In another example, the object may be detected by determining an area 1420 of the object. Referring to FIG. 10, since the second trailer 1020 is occluded by the first trailer 1010, the reflection point 1420 of the second trailer 1020 represented in the target image 1050 may be a portion of the whole. Accordingly, the object may be detected based on the reflection point 1420, but the class of the object may not be accurately determined. For example, if the accurate class of the object is not determined, the class may be determined to be unknown.

Although the target image 1050 of FIG. 14 used for object detection is shown as a CFAR-applied target image, the target image 1050 may be an image obtained by grouping adjacent reflection points by further applying the clustering technology to the CFAR-applied target image.

Figure 15:
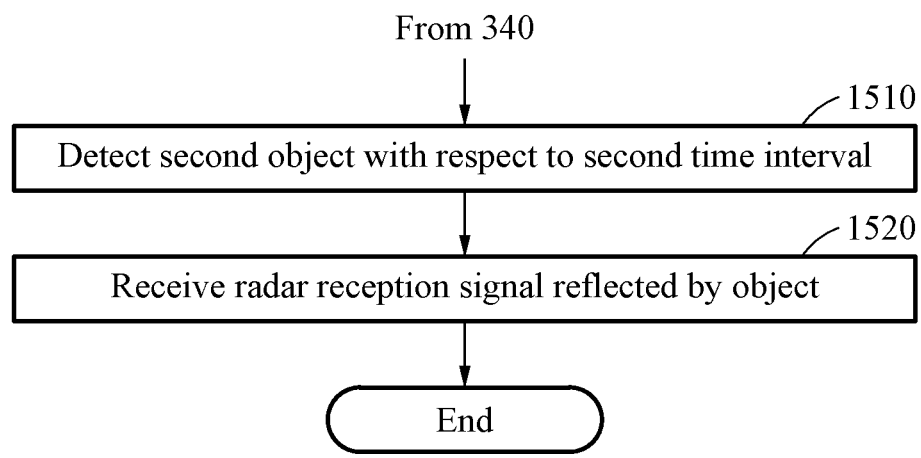
FIG. 15 illustrates an example of tracking an object based on a detected object.

FIG. 15 illustrates an example of tracking an object based on a detected object. The operations in FIG. 15 may be performed in the sequence and manner as shown, although the order of some operations may be changed or some of the operations omitted without departing from the spirit and scope of the illustrative examples described. Many of the operations shown in FIG. 15 may be performed in parallel or concurrently. One or more blocks of FIG. 15, and combinations of the blocks, can be implemented by special purpose hardware-based computer, such as a processor, that perform the specified functions, or combinations of special purpose hardware and computer instructions. In addition to the description of FIG. 15 below, the descriptions of FIGS. 1-14 are also applicable to FIG. 15, and are incorporated herein by reference. Thus, the above description may not be repeated here.

After operation 340 is performed, operations 1510 and 1520 may be further performed.

The object detected through operations 310 to 340 may be an object detected with respect to a first time interval. That is, the data set generated in operation 330 may be with respect to the first time interval.

In operation 1510, the electronic device 200 detects a second object by performing operations 310 to 340 again with respect to a second time interval.

In operation 1520, the electronic device 200 tracks the object based on the second object. For example, if the first object and the second object are the same object, the position and velocity of the object may be tracked. In addition, the electronic device 200 may predict the position and velocity of the object with respect to a future time interval by tracking the object.

Figure 16:
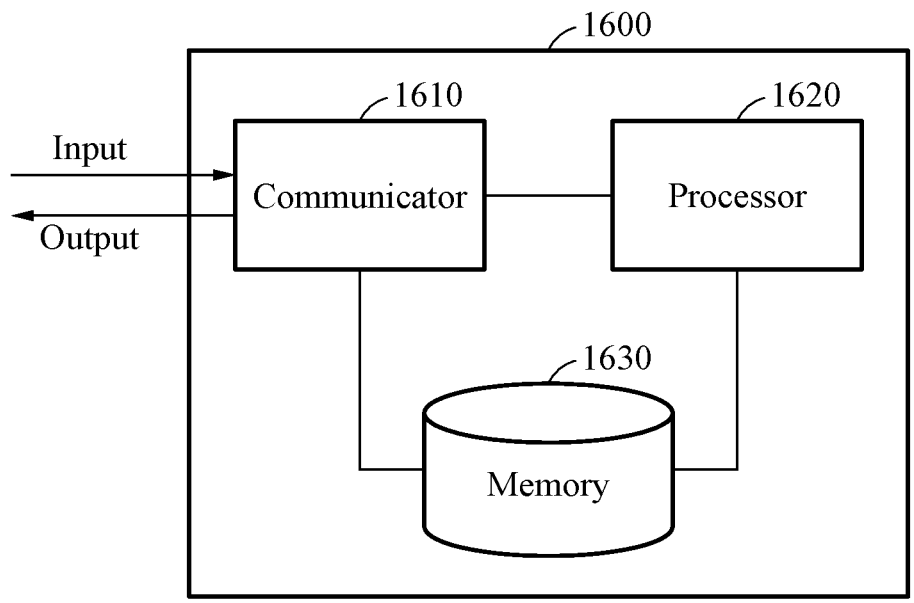
FIG. 16 illustrates an example of an electronic device for updating an algorithm for detecting an object.

FIG. 16 illustrates an example of an electronic device for updating an algorithm for detecting an object.

Referring to FIG. 16, an electronic device 1600 for updating an algorithm includes a communicator 1610, a processor 1620, and a memory 1630. For example, the electronic device 1600 may be a device that updates or trains the object detection algorithm described above with reference to FIGS. 2 to 15. Hereinafter, the term "update" and the term "train" may be used interchangeably.

The electronic device 1600 may be a server having excellent computing ability. In another example, the electronic device 1600 may be a device included in the electronic device 200.

The communicator 1610 is connected to the processor 1620 and the memory 1630 and transmits and receives data to and from the processor 1620 and the memory 1630. The communicator 1610 may be connected to another external device and transmit and receive data to and from the external device.

The communicator 1610 may be implemented as a circuitry in the electronic device 1600. For example, the communicator 1610 may include an internal bus and an external bus. In another example, the communicator 1610 may be an element that connects the electronic device 1600 to the external device. The communicator 1610 may be an interface. The communicator 1610 may receive data from the external device and transmit the data to the processor 1620 and the memory 1630.

The processor 1620 processes the data received by the communicator 1610 and data stored in the memory 1630. The processor 1620 executes a computer-readable code (for example, software) stored in a memory (for example, the memory 1630) and instructions triggered by the processor 1620.

The memory 1630 stores the data received by the communicator 1610 and data processed by the processor 1620. For example, the memory 1630 may store the program (or an application, or software). The stored program may be a set of syntaxes that are coded and executable by the processor 1620 to update an algorithm.

The memory 1630 may include one or more volatile memories, non-volatile memories and RAM, flash memories, hard disk drives, and optical disk drives.

The memory 1630 may store an instruction set (for example, software) for operating the electronic device 1600. The instruction set for operating the electronic device 1600 is executed by the processor 1620.

The communicator 1610, the processor 1620, and the memory 1630 will be described further below with reference to FIGS. 17 and 18.

Figure 17:
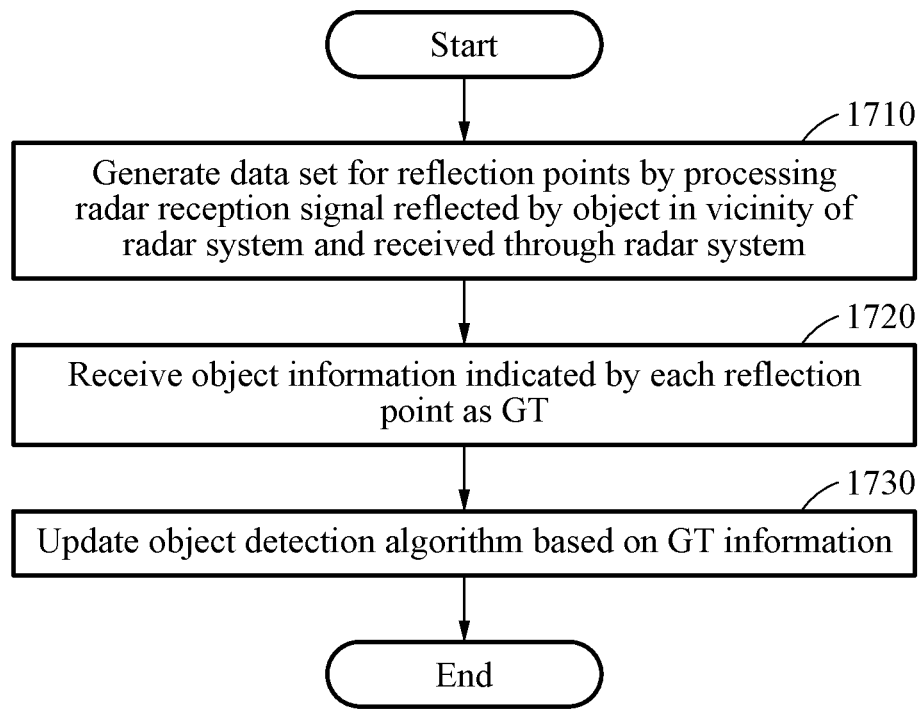
FIG. 17 illustrates an example of updating an algorithm for detecting an object.

FIG. 17 illustrates an example of updating an algorithm for detecting an object. The operations in FIG. 17 may be performed in the sequence and manner as shown, although the order of some operations may be changed or some of the operations omitted without departing from the spirit and scope of the illustrative examples described. Many of the operations shown in FIG. 17 may be performed in parallel or concurrently. One or more blocks of FIG. 17, and combinations of the blocks, can be implemented by special purpose hardware-based computer, such as a processor, that perform the specified functions, or combinations of special purpose hardware and computer instructions. In addition to the description of FIG. 17 below, the descriptions of FIGS. 1-16 are also applicable to FIG. 17, and are incorporated herein by reference. Thus, the above description may not be repeated here.

Operations 1710 through 1740 described below are performed by the electronic device 1600 described above with reference to FIG. 16.

In operation 1710, the electronic device 1600 generates a 3D data set for reflection points by processing radar reception signals reflected by an object in the vicinity of a radar apparatus and received through the radar apparatus. The description of operation 1710 may be replaced with the description of operation 330 described above with reference to FIG. 3.

The 3D data set may be transformed or post-processed depending on the type of object detection algorithm. For example, when the depth of the data set is 4 or more, the data set may be transformed by adjusting the number of bins for FFT. In another example, if the depth of the data set is 3, a radar image may be generated based on the data set.

In operation 1720, the electronic device 1600 receives object information indicated by each reflection point as a GT. For example, at least one of the object range, velocity, angle, and class for the actual object represented by the reflection point may be received as the GT from a user of the electronic device 1600. In addition, if a plurality of reflection points away from each other are generated by the same object, information with respect to a second reflection point representing the same object together with a first reflection point with respect to a first reflection point may be received as the GT. The reflection points of the data set are labeled based on GT information.

Referring to the target image shown in FIG. 11, the GTs representing the trailer are received and labeled for the detected reflection points 1141, 1142 and 1143 included in the area 1150 representing the shape of the trailer.

Referring to the target image shown in FIG. 14, the GTs representing the trailer are received and labeled for the detected reflection points 1402 and 1404 included in an area 1410 representing the shape of the trailer.

In operation 1730, the electronic device 1600 updates the object detection algorithm based on the GT information. The updating method may be supervised learning. In addition, the object detection algorithm may be updated further based on the received class. The object detection algorithm may be updated using data sets generated in various environments and GTs for the data sets.

If the object detection algorithm is properly updated, the object detection algorithm may match a single object, for example, a trailer, to the detected reflection points 1141, 1142, and 1143 included in the area 1150 of the target image shown in FIG. 11, and match a trailer to the detected reflection points 1402 and 1404 included in the area 1410 of the target image 1050 shown in FIG. 14.

The method of updating the object detection algorithm may further include determining an operation mode corresponding to the configuration of antennas included in the radar apparatus and the form of a radar transmission signal, and the object detection algorithm may vary depending on the operation mode.

Figure 18:
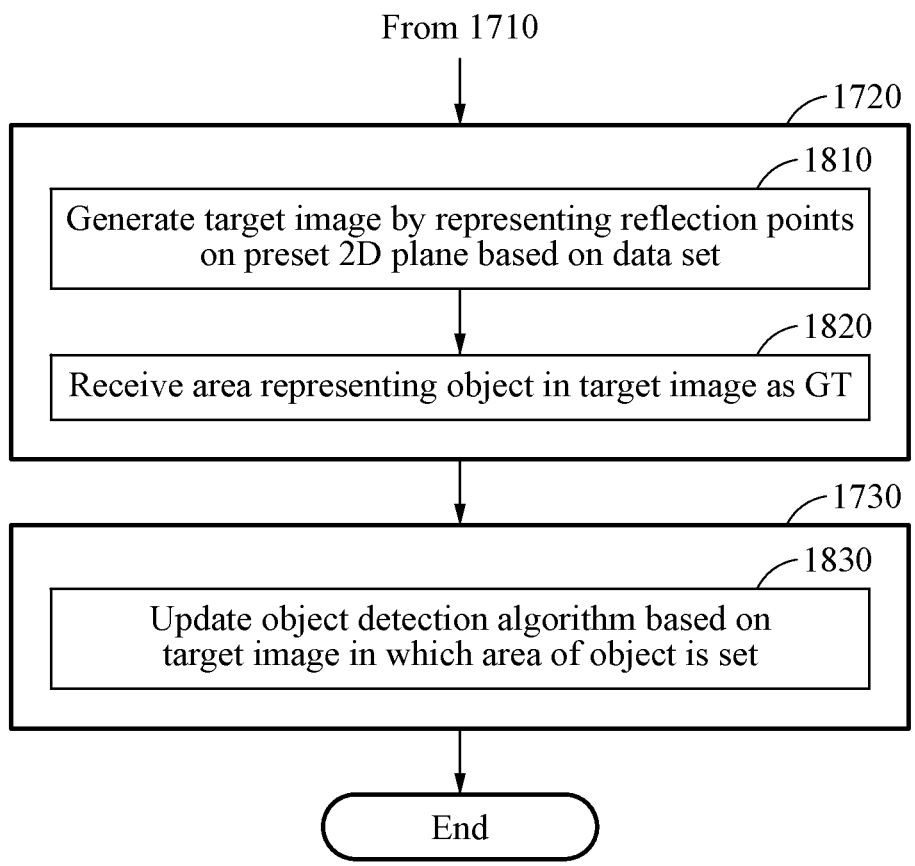
FIG. 18 illustrates an example of updating an algorithm for detecting an object based on a target image representing reflection points.

FIG. 18 illustrates an example of updating an algorithm for detecting an object based on a target image representing reflection points. The operations in FIG. 18 may be performed in the sequence and manner as shown, although the order of some operations may be changed or some of the operations omitted without departing from the spirit and scope of the illustrative examples described. Many of the operations shown in FIG. 18 may be performed in parallel or concurrently. One or more blocks of FIG. 18, and combinations of the blocks, can be implemented by special purpose hardware-based computer, such as a processor, that perform the specified functions, or combinations of special purpose hardware and computer instructions. In addition to the description of FIG. 18 below, the descriptions of FIGS. 1-17 are also applicable to FIG. 18, and are incorporated herein by reference. Thus, the above description may not be repeated here.

A method of inputting GT information for updating an object detection algorithm may be adaptively transformed according to the type of the object detection algorithm. For example, if the object detection algorithm is the algorithm for processing the target image described above with reference to FIGS. 7 to 14, operation 1720 may include operations 1810 and 1820 described below, and operation 1730 may include operation 1830 described below.

In operation 1810, the electronic device 1600 generates the target image by representing reflection points on a preset 2D plane based on the data set. The description of the example of generating the target image may be replaced with the description of operation 710 described above with reference to FIG. 7.

In operation 1820, the electronic device 1600 receives an area representing the object in the target image as a GT. For example, the area of the object and the class of the object may be received from the user of the electronic device 1600. The area of the object may be received to include at least one reflection point in the target image. If a plurality of reflection points being away from each other are generated by the same object, the area of the object may be set to include the reflection points. The reflection points in the target image are labeled based on GT information.

In operation 1830, the electronic device 1600 updates the object detection algorithm based on the target image in which the area of the object is set.

The radar apparatus, electronic device 200, communicator 210, electronic device 1600, communicator 1610, and other apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an FPGA, a programmable logic unit (PLU), a central processing unit (CPU), a graphics processing unit (GPU), a neural processing unit (NPU), or any other device capable of responding to and executing instructions in a defined manner.

The methods illustrated herein that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the object detection method. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An object detection method performed by an electronic device, the object detection method comprising:
    receiving a radar reception signal reflected by an object using a radar apparatus;
    generating a data set for one or more reflection points of the object by processing the radar reception signal;
    transforming the data set according to a type of a neural network-based object detection model; and
    detecting the object corresponding to the reflection points based on the transformed data set using the neural network-based object detection model,
    wherein voxel coordinates for a target reflection point are determined in the data set, and a voxel value of the voxel coordinates corresponds to a signal strength of the radar reception signal by the target reflection point, and
    wherein the detecting comprises:
        determining pixel coordinates in a two-dimensional (2D) plane based on the voxel coordinates,
        determining respective values of a number of channels based on the voxel value,
        determining a pixel value of the pixel coordinates based on the respective values of the channels, and
        generating a target image by representing the reflection points on the 2D plane based on the data set.

2. The object detection method of claim 1, further comprising:
    transmitting a radar transmission signal through a transmission antenna of the radar apparatus,
    wherein the radar reception signal comprises the radar transmission signal reflected by the object.

3. The object detection method of claim 1, further comprising:
    determining voxel coordinates for a target reflection point in the data set,
    wherein the data set comprises a velocity axis, a range axis, and an angle axis, and a voxel value of the voxel coordinates corresponds to a signal strength of the radar reception signal by the target reflection point.

4. The object detection method of claim 1, wherein the determining of the pixel coordinates based on the voxel coordinates comprises:
    converting a velocity value of the voxel coordinates into a pre-calculated constant; and
    determining the pixel coordinates based on the converted voxel coordinates.

5. The object detection method of claim 4, wherein the data set comprises a velocity axis, a range axis, and an angle axis, and
    the constant is calculated by taking absolute values and a mean value of values on the velocity axis.

6. The object detection method of claim 1, wherein the number of channels are red (R), green (G) and blue (B) channels.

7. The object detection method of claim 1, wherein the detecting of the object based on the target image comprises:
    setting an area of the object in the target image based on pixels of the target image corresponding to the reflection points; and
    detecting the object based on the area of the object.

8. The object detection method of claim 7, wherein the detecting of the object based on the target image comprises determining a class of the object based on the pixels of the target image corresponding to the reflection points, and
    the detecting of the object based on the area of the object comprises detecting the object based on the area of the object and the class of the object.

9. The object detection method of claim 1, wherein the object detection model is set differently according to at least one of a configuration of antennas included in the radar apparatus and a form of a radar transmission signal.

10. The object detection method of claim 1, wherein the electronic device is provided in an autonomous vehicle or a vehicle supporting advanced driver-assistance systems (ADAS).

11. The object detection method of claim 1, wherein the data set corresponds to a time interval, and
    the object detection method further comprises tracking the object based on a first object detected with respect to a first time interval and a second object corresponding to the first object detected with respect to a second time interval.

12. A non-transitory computer-readable storage medium storing instructions that, when executed by a processor, cause the processor to perform the object detection method of claim 1.

13. An electronic device for detecting an object, the electronic device comprising:
    a memory configured to store a program; and
    a processor configured to execute the program to
        receive a radar reception signal reflected by an object using a radar apparatus;
        generate a data set for one or more reflection points of the object by processing the radar reception signal;
        transform the data set according to a type of a neural network-based object detection model; and
        detect the object corresponding to the reflection points based on the transformed data set using the neural network-based object detection model,
        wherein voxel coordinates for a target reflection point are determined in the data set, and a voxel value of the voxel coordinates corresponds to a signal strength of the radar reception signal by the target reflection point, and
        wherein the processor further configured to:

determine pixel coordinates in a two-dimensional (2D) plane based on the voxel coordinates, determine respective values of a number of channels based on the voxel value, determine a pixel value of the pixel coordinates based on the respective values of the channels, and generate a target image by representing the reflection points on the 2D plane based on the data set.

14. The electronic device of claim 13, wherein the electronic device is provided in an autonomous vehicle or a vehicle supporting advanced driver-assistance systems (ADAS).

15. A method of updating an object detection model, performed by an electronic device, the method comprising:

generating a data set for one or more reflection points of an object by processing a radar reception signal reflected by the object and received through a radar apparatus;

transforming the data set according to a type of the object detection model;

receiving object information indicated by each of the one or more reflection points as a ground truth (GT); and updating the object detection model based on GT information, wherein voxel coordinates for a target reflection point are determined in the data set, and a voxel value of the voxel coordinates corresponds to a signal strength of the radar reception signal by the target reflection point, and wherein the receiving of the object information comprises:

determining pixel coordinates in a two-dimensional (2D) plane based on the voxel coordinates, determining respective values of a number of channels based on the voxel value, determining a pixel value of the pixel coordinates based on the respective values of the channels, and generating a target image by representing the one or more reflection points on the 2D plane based on the data set; and receiving an area representing the object in the target image as the GT.

16. The method of claim 15, wherein the updating of the object detection model based on the GT information comprises updating the object detection model based on the target image in which the area of the object is set.

17. The method of claim 15, further comprising:

determining an operation mode corresponding to any one or any combination of a configuration of antennas included in the radar apparatus and a form of a radar transmission signal; and changing the object detection model based on the operation mode.

* * * * *